United States Patent [19]

Labita

[11] Patent Number: 4,483,366

[45] Date of Patent: Nov. 20, 1984

[54] LOCKING VALVE

[76] Inventor: Leonard Labita, 364 Demorest Ave., Staten Island, N.Y. 10314

[21] Appl. No.: 370,476

[22] Filed: Apr. 21, 1982

Related U.S. Application Data

[63] Continuation-in-part of Ser. No. 174,157, Jul. 31, 1980, abandoned.

[51] Int. Cl.³ ............................................. F16K 35/06
[52] U.S. Cl. ...................................... 137/385; 70/179
[58] Field of Search ..................... 137/383, 384, 385; 251/90, 91, 286, 287, 288; 70/176, 177, 178, 179

[56] References Cited

U.S. PATENT DOCUMENTS

| | | | |
|---|---|---|---|
| 835,523 | 11/1906 | Hill, Jr. | 137/385 |
| 846,257 | 3/1907 | Stratiff | 137/385 |
| 1,016,872 | 2/1912 | Comer | 137/385 |
| 1,108,477 | 8/1914 | Schneider | 137/385 |
| 1,275,135 | 8/1918 | Cunningham | 137/385 |
| 1,339,412 | 5/1920 | Peters | 137/385 |
| 1,377,668 | 5/1921 | Cates et al. | 137/385 |
| 1,408,652 | 3/1922 | Steinberg | 137/385 |
| 2,016,797 | 10/1935 | Burns et al. | 70/176 |
| 2,463,446 | 3/1949 | Wallace | 137/385 |
| 2,693,815 | 11/1954 | Gould | 137/385 |
| 3,319,671 | 5/1967 | Wiseman | 137/385 |
| 3,477,691 | 11/1969 | Griswold | 251/286 |
| 3,554,218 | 1/1971 | Smith | 137/385 |
| 4,024,740 | 5/1977 | DiGiovanni | 137/384 |

FOREIGN PATENT DOCUMENTS 906832 9/1962 United Kingdom .

*Primary Examiner*—Martin P. Schwadron
*Assistant Examiner*—John A. Rivell
*Attorney, Agent, or Firm*—Fitzpatrick, Cella, Harper & Scinto

[57] ABSTRACT

A locking valve having a housing and a valve element movable with respect to the housing to selectively occlude a passageway through the housing. Stops on the outside of the housing normally limit movement of the valve element to a first range of positions encompassing a normal closed position and a normal open position. An interior locking mechanism concealed within the housing is operative to arrest the valve upon its movement to one of such positions. The interior locking mechanism is also operative to arrest the valve element upon its movement to a position outside of the normal or first range of positions. Thus, the interior locking mechanism cannot be defeated by removing the exterior stops and moving the valve element beyond its normal range of positions. The interior locking mechanism prevents removal of the valve element, and the interior locking mechanism is protected from forcing or picking.

12 Claims, 9 Drawing Figures

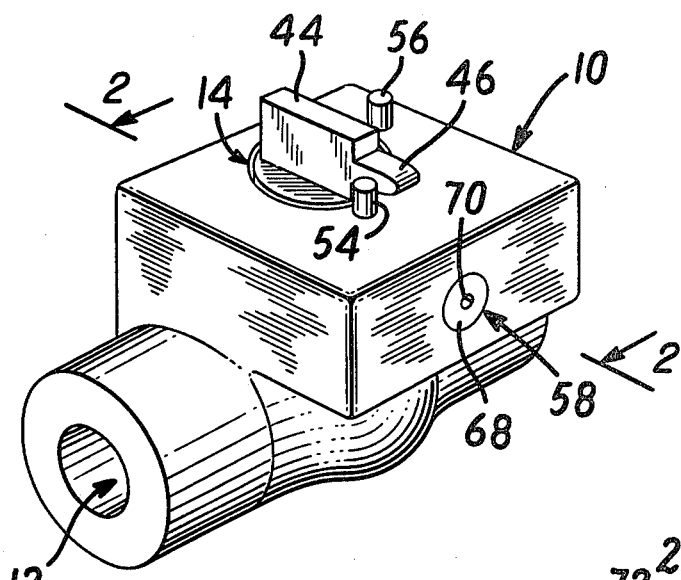
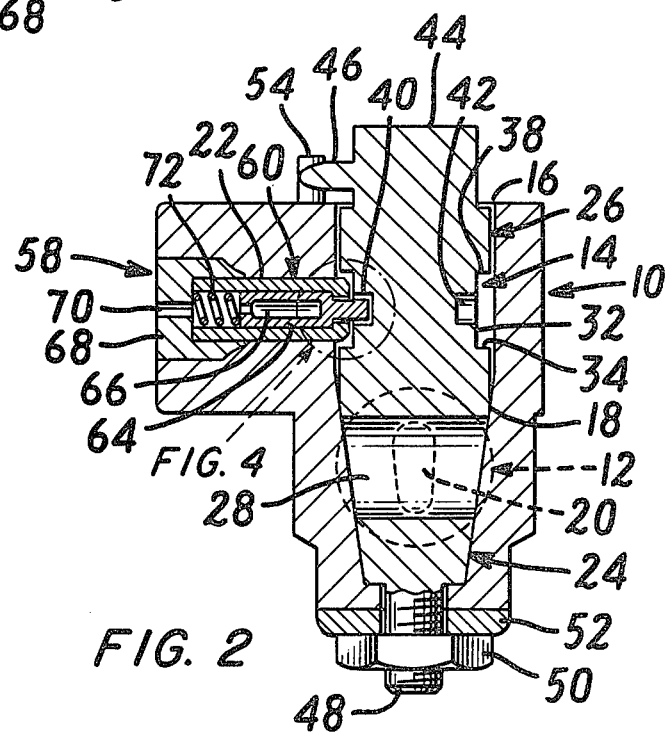
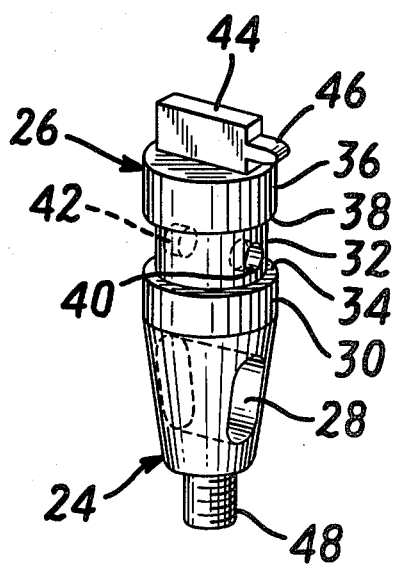
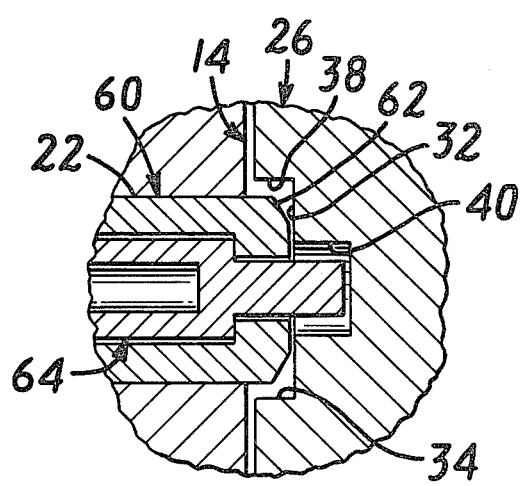
FIG. 1
FIG. 2
FIG. 3
FIG. 4

LOCKING VALVE

BACKGROUND OF THE INVENTION

FIELD OF THE INVENTION

This invention relates to valves, and more particularly to a valve having locking means to prevent unauthorized or unintended operation, and is a continuation-in-part of application Ser. No. 174,157 filed July, 31, 1980, now abandoned.

Such valves are often used in piping installations where valuable commodities are to be conveyed, such as in natural gas supply lines.

Numerous automatically locking valves have been proposed for such use. These valves have devices which automatically arrest the movable element of the valve whenever it is moved to a closed position; only an authorized person in possession of the proper key can release the valve element once it has been so arrested. For example, U.S. Pat. No. 2,016,797 teaches a stop lock having a conical plug rotatable over a 360° range. In either of two open positions, 180° from one another, a passageway in the plug is aligned with a passageway of the housing. In either of two closed positions, 180° from one another and 90° from the open positions, the passageway in the plug is not aligned with the passageway in the housing so that the plug occludes the passageway. A pair of recesses are formed on a stem connected to the plug and rotatable therewith. A lock pin is slidably mounted to the housing and is biased toward the stem. The recesses in the stem are arranged so that whenever the plug is in one of its closed positions, one of the recesses will be aligned with the lock pin and the lock pin will enter such recess to arrest the stem and plug. Because the lock pin is recessed within the housing, the lock pin can only be retracted away from the stem to release it by the use of a special key, which is possessed only by authorized persons.

However, the two closed positions of the plug are not differentiated from one another. An unauthorized person might turn the plug to either of its closed positions in an innocent attempt to shut the valve during an emergency. Thus, an authorized person who is called to release the plug after it has been arrested at one of the closed positions will not be able to tell whether the plug is in such position as a result of innocent operation or as a result of tampering. Further, if a tamperer attempts to defeat the locking features of this valve by driving the plug and stem out of the valve housing, the lock pin will bear the full force of such attack.

An alternative form of locking valve is set forth in U.S. Pat. No. 1,275,135. This locking valve also has a plug rotatable between two closed positions and two open positions and a stem which rotates with the plug. Stops on the outside of the housing normally limit the rotation of the stem and plug to a range between a normal closed position and a normal open position. When the stem and plug are in the normal closed position, a spring loaded lock pin slidably carried by the stem enters into a recess in the housing. However, if a tamperer removes the stops on the outside of the housing, he can rotate the stem and plug to an abnormal closed position in which the pin does not engage the recess and he can then rotate the stem and plug back to an open position. Thus, if the external stops on the valve have been defeated, the valve can be closed and opened at will.

Other locking valves are described in the following U.S. Pat. Nos. 359,714; 703,564; 1,231,164; 1,240,734; 1,325,189; 1,696,757; 2,058,951; 3,450,148; 3,540,481; and 3,560,130.

SUMMARY OF THE INVENTION

The present invention provides a locking valve which is resistant to tampering but which appears susceptible to certain readily-detectable types of tampering, so that anyone intent on defeating the locking mechanism will be led to make an ineffective but readily-detectable attempt. The locking valve of the instant invention provides an unmistakable indication when an attempt has been made to defeat the locking mechanism by the most likely methods. Another feature of the present invention is the provision in a locking valve of a rugged, well-protected locking mechanism which cannot be defeated by force without destroying the valve. The features can be attained, by practice of the present invention, in a locking valve which can be readily and economically manufactured.

In broad compass, a valve built to incorporate the present invention includes a housing which defines a fluid passageway and valve element seated in the housing for movement over a first range of positions, said first range encompassing a normal closed position and a normal open position. The valve element occludes said passageway when it is in its normal closed position, but the valve element does not occlude said passageway when it is in its normal open position. The valve element is also movable through a second range of positions outside of the first range. The valve includes interior lock means for automatically arresting rotation of the valve element upon its movement to one of the normal positions. The interior lock means is also operative to arrest rotation of the valve element upon its movement to a position within the second range of positions. The operative structures of the interior lock means are disposed inside the housing. Once rotation of the valve element has been arrested by the interior lock means, the interior lock means will only release the valve element upon actuation by an authorized person. Exterior stop means are provided for limiting movement of the valve element to the first range of positions. The operative structures of the exterior stop means are accessible from the outside of the housing. Means for selectively moving the valve element are also provided.

During "innocent" operation of the valve, the valve element will only move within its first range of positions. Depending on the arrangement of the interior lock means in the particular valve, rotation of the valve element will be arrested when it is moved to its normal closed position or when it is moved to its normal open position. It will be readily apparent or generally assumed that interior lock means are incorporated in the valve to arrest rotation of the valve element at one position within its first range of positions. However, no external feature of the valve and no sequence of events during innocent operation of the valve will reveal that the interior lock means can also arrest the valve element at a position outside of its normal or first range of positions. Therefore, one intending to disable the interior lock means will naturally attempt to do so by disabling the exterior stop means and moving the valve element beyond its normal or first range of positions, into its second range of positions. During such movement of the valve element, the valve element will reach a position where it is arrested by the interior lock means. The tamperer will thus be doubly defeated. First, he must call an authorized person to release the valve element for further operation of the valve. Second, it will be apparent to such authorized person that the valve element is in an abnormal position. As the valve element cannot be moved to such position during innocent operation of the valve, the abnormal positioning of the valve element will provide unequivocal evidence of the attempted tampering.

In more detailed scope, a valve built to incorporate the present invention includes a housing which defines a fluid passageway, a stem bore open to the outside of the housing at one end and a lock bore intersecting the stem bore. The valve also includes an elongated stem having a relatively narrow portion, a relatively wide portion and a circumferential shoulder at the juncture of such portions. The stem has at least one recess in its relatively narrow portion. The stem is coaxially disposed in the stem bore so that the narrow portion of the stem confronts the lock bore and the shoulder of the stem faces towards the open end of the stem bore. A valve element is connected to the stem for movement in conjunction with rotation of the stem between a closed position and open position. In the preferred embodiment, the valve element is adapted to seat in the stem bore and has a passageway therethrough. In the normal open position the valve element passageway is aligned with the housing fluid passageway to permit fluid communication therethrough. In the normal closed position such fluid communication is prevented.

The recess of the stem is arranged so that it is aligned with the lock bore of the housing when the valve element is in one of the aforementioned positions. A sleeve is coaxially mounted in the lock bore so that the sleeve projects into the stem bore adjacent the shoulder of the stem. Thus, the sleeve prevents axial movement of the stem outwardly through the open end of the stem bore. A lock pin is slidably mounted in the bore of the sleeve, and means are provided for biasing the lock pin towards the stem. The lock pin bears on the stem and enters the recess of the stem when such recess is aligned with the lock bore. The lock pin will arrest rotation of the stem and thus of the valve element when one of the recesses of the stem is aligned with the lock bore.

If an attempt is made to defeat the locking mechanism of the valve by forcibly withdrawing the stem from the housing through the open end of the stem bore, the sleeve will engage the shoulder of the stem. Thus, the sleeve, will bear the forces applied to the stem during such an attack and will protect the lock pin from such forces.

Other objects, features and advantages of the present invention will be more readily apparent from the following detailed description of the preferred embodiments when read in conjunction with the accompanying drawings.

BRIEF DESCRIPTION OF THE DRAWINGS

FIG. 1 is a perspective view of a valve according to one embodiment of the present invention.

FIG. 2 is a sectional view taken along line 2—2 in FIG. 1.

FIG. 3 is a perspective view of the stem and valve element of the valve depicted in FIGS. 1 and 2.

FIG. 4 is a fragmentary view, on an enlarged scale, of the area indicated by the numeral 4 in FIG. 2.

DETAILED DESCRIPTION OF THE PREFERRED EMBODIMENTS

Figure 5:
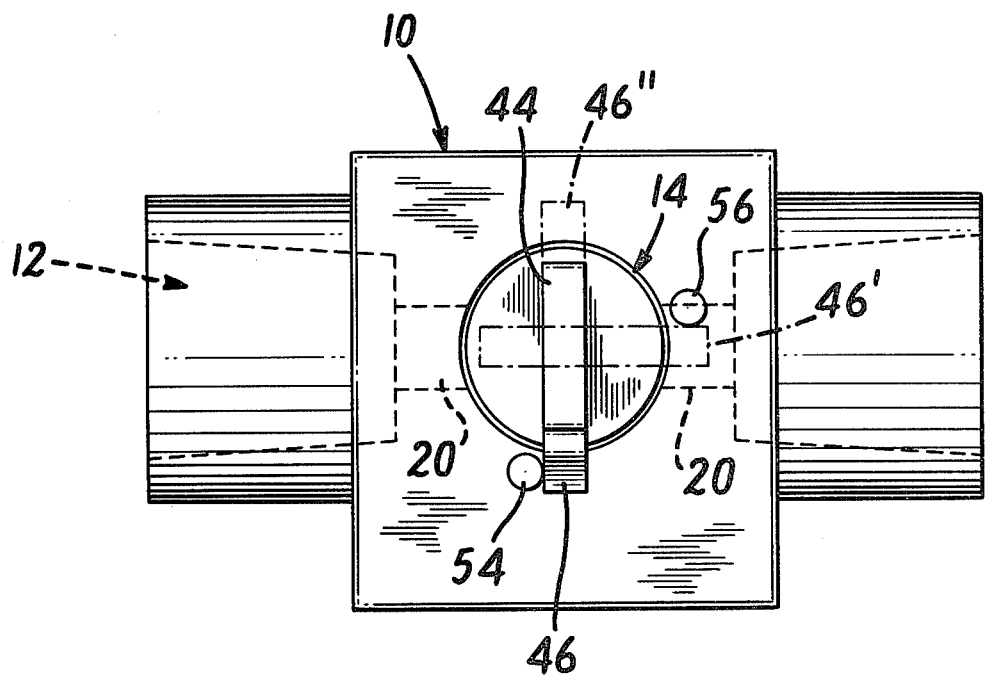
FIG. 5 is a top plan view of the valve depicted in FIGS. 1 through 4.

As seen in FIGS. 1, 2 and 5, a valve according to the preferred embodiment of the present invention includes a housing 10 which defines a fluid passageway 12 open at both ends; ordinary pipe threads being provided at the ends of the passageway in the conventional manner. The housing also defines a stem bore 14 which is open to the exterior of the housing at the top 16 (FIG. 2). The stem bore 14 intersects the passageway 12, and the stem bore is tapered at its intersection with the passageway to form a frusto conical seat 18. As seen in FIGS. 2 and 5, the passageway 12 has narrowed portions 20 adjacent to its intersection with the stem bore. The housing also defines a lock bore 22 which communicates with the outside of the housing and perpendicularly intersects the stem bore 14 between its tapered seat 18 and its open end 16.

The valve also includes a valve element which, in the embodiment depicted, takes the form of a tapered frusto-conical plug 24 (FIGS. 2 and 3), which is formed as an extension of and is coaxial with an elongated stem 26. Plug 24 has a bore 28 extending therethrough transverse to its axis. Stem 26 has a first wide cylindrical portion 30 adjacent plug 24, a narrow cylindrical portion 32, and a first circumferential shoulder 34 at the juncture of such portions. The stem also has a second wide cylindrical portion 36 and a second circumferential shoulder 38 at the juncture of portions 36 and 32.

A pair of diametrically opposed radial recesses 40 and 42 are formed in narrow portion 32 of the stem.

A wrenching lug 44 projects axially from the second wide portion 36. A stop wing 46 projects radially from the wrenching lug 44. A threaded extension 48 projects axially from the tapered plug 24.

As best seen in FIG. 2, the stem and tapered plug are both coaxial with the stem bore 14 and are rotatable therein. When tapered plug 24 is seated in tapered seat 18, said narrow portion 32 of the stem confronts lock bore 22 of the housing, with shoulder 34 facing the open end 16 of the stem bore. The wrenching lug 44 of the stem projects beyond the surface of the housing at the open end of the stem bore, so that the valve element can be rotated by engaging the wrenching lug. The threaded extension 48 of the plug projects through a hole in the housing at the bottom thereof. A nut 50 engages extension 48 to retain the stem and plug assembly in position, and a washer 52 is interposed between the nut 50 and the housing.

A normal closed stop 54 and a normal open stop 56 (FIGS. 1 and 5) are formed at the top and on the outside of the housing adjacent the open end of the stem bore. These stops cooperate with stop wing 46 of wrenching lug 44 to limit rotation of the stem and plug to a first range of positions encompassing approximately 90° of rotation. This first range of positions includes, at one extreme, the normal closed position depicted in FIGS. 1 and 2 and shown in solid lines in FIG. 5. When the stem and tapered plug are in this normal closed position, stop wing 46 abuts stop 54 and bore 28 of tapered plug 24 does not communicate with passageway 12. In the normal closed position, because bore 28 is not aligned with the passageway, the tapered plug prevents passage of fluid through the valve. Also, when the tapered plug is in the normal closed position, first recess 40 of the stem is aligned with lock bore 22 of the housing.

The first range of positions defined by the stops 54 and 56 also includes a normal open position at its other extreme. When the stem and valve element are in this normal open position, stop wing 46 abuts the normal open stop 56 as indicated at 46' in FIG. 5. In this position, bore 28 is aligned with passageway 12 and thus permits fluid communication through the valve. When the tapered plug is in this normal open position, neither of the recesses 40 and 42 of the stem is aligned with lock bore 22.

As best seen in FIGS. 2 and 4, a lock assembly 58 is mounted in lock bore 22 of the housing. Lock assembly 58 includes an axial stop which in the embodiment shown takes the form of a hollow cylindrical sleeve 60 mounted in lock bore 22 so that one end 62 of the sleeve projects into stem bore 14 between shoulders 34 and 38, closely confronting the cylindrical surface of narrow portion 32 of the stem. A lock pin 64 is coaxially received in the bore of sleeve 60, which lock pin is slidably supported by and within the sleeve at or near the projecting end of the sleeve. The lock pin has a cylindrical bore 66. A cap 68 is fixedly mounted in the lock bore adjacent its open end. This cap has a narrow hole 70 therethrough which is coaxially aligned with bore 66 in the lock pin. A coil spring 72 is disposed between cap 68 and lock pin 64 and is compressed between lock pin 64 and cap 68 so that the spring biases the lock pin towards the stem.

It will be apparent to those skilled in the art that the axial stop need not be mounted in the same bore as lock pin 64 and, in that event, need not be hollow. Economy of fabrication suggests, however, that the preferred embodiment is that shown in FIG. 5.

When the tapered plug is in its normal open position or in any position between the normal open position and the normal closed position, the inner end of lock pin 64 rides on the cylindrical surface of the narrow portion 32. However, when the tapered plug is rotated to the normal closed position, as seen in FIGS. 2 and 4, the inner end of lock pin 64 enters recess 40 and thus arrests further rotation of the stem and tapered plug.

The stem and tapered plug can only be released, once they are so arrested, by drawing lock pin 64 back away from the stem (towards the left as seen in FIG. 2) against the bias of coil spring 72. However, because the lock pin is concealed within the housing and protected by the cap 68, it is almost impossible to engage the lock pin and retract it in this manner except by use of a key of the type known in the gas utility industry as a "Smith-Morse" key.

Figure 6:
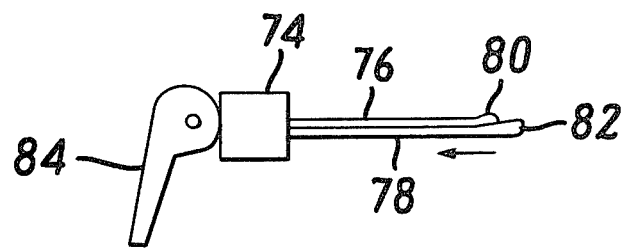
FIG. 6 is a schematic view of a key.

As seen in FIG. 6, this key has a body 74 and a pair of elongated fingers 76 and 78 projecting from the body. The fingers 76 and 78 have bulbous end portions 80 and 82 respectively, and have mating sloping surfaces adjacent to such end portions. An eccentric cam 84 is pivotally mounted to the body 74 and appropriate mechanisms (not shown) are provided for moving finger 78 so that, when cam 84 is moved from the position illustrated in FIG. 6, end portion 82 of finger 78 is brought alongside finger 76. This effectively enlarges the diameter of the distal end of the key. After expansion of the distal end of the key in this fashion, continued movement of cam 84 draws finger 78 toward body 74.

This key may be utilized to draw back the lock pin 64 of the valve. The key is inserted through hole 70 in cap 68 into bore 66 of the lock pin while the fingers of the key are in the position illustrated in FIG. 6 until the body 74 of the key bears on the exterior surface of cap 68. After the key has been so inserted, cam 84 is rotated. Expansion of the distal end of the key causes the same to engage the interior surface of bore 66 in the lock pin. Continued motion of the lever draws the finger 78, and thus the engaged lock pin, back toward the body of the key and away from the stem.

The key is ordinarily possessed only by authorized persons. Therefore, it will be impossible for an unauthorized person to reopen the valve after turning it to its normal closed position. A tamperer intent on defeating the interior locking mechanism, for example, one wishing temporarily to shut off the gas in order to by-pass the meter is likely to assume or will quickly learn that the valve cannot be reopened by an unauthorized person after it has been turned to its normal closed position. However, nothing in the exterior appearance of normal operating sequence of the valve would lead one to believe that the interior locking mechanism is also operative to prevent reopening of the valve after it has been closed by rotating the stem outside of its first or normal range of positions. Such a tamperer might, therefore, be led to attempt to defeat the interior locking mechanism by disabling the exterior stops (as by removing the normal open stop 56 of the housing). He might then close the valve by rotating the stem beyond the first range of positions normally permitted by the stops, into a second range of positions normally prohibited by the stops. When the tapered plug and stem are rotated to an abnormal closed position, 180° from the normal closed position described above, the stop wing of the stem will be in the position indicated in broken lines at 46" in FIG. 5. Bore 28 of the valve element will again be transverse to the passageway 12 of the housing and the valve element will thus occlude the passageway. Thus, the tamperer will have succeeded in closing the valve.

However, when the valve element and stem are in this abnormal closed position, the second recess 42 of the stem (FIGS. 2 and 3) will be aligned with the lock bore and the end of the lock pin 64 will enter the second recess under the influence of the spring 72. Thus, rotation of the tapered plug will again be arrested; only to be released by an authorized person in possession of a suitable key. Not only will the tamperer be unable to reopen the valve, but when an authorized person is called to reopen it, the abnormal position of the stem will be a clear indication of deliberate tampering.

The valve described above is especially secure against attempts to defeat the interior locking mechanism by force. As seen in FIG. 4, projecting end 62 of sleeve 60 extends close to the surface of the sleeve and slidably supports lock pin 64. Thus, the projecting end of the sleeve effectively reinforces the lock pin against the bending moments which otherwise would be applied to it in an attempt forcibly to rotate the stem while the pin is engaged in one of the recesses.

As stated above, the end 62 of the sleeve (FIG. 4) projects into the sleeve bore and thus confronts the first shoulder 34 of the stem. Therefore, if an attempt is made to defeat the locking mechanism by removing nut 50 (FIG. 2) and driving the stem out of the housing through open end 16 of the stem bore, the projecting end of sleeve 60 will engage the shoulder of the stem and thus prevent removal of the stem and valve element. Because the sleeve surrounds the lock pin 64, the lock pin is protected from any forces which would otherwise be applied to it during such an attempt. Because the first shoulder 34 of the stem extends entirely around the circumference of the stem, the projecting end of the sleeve will engage the shoulder and prevent removal of the stem and valve element regardless of their rotational position. The tapered seat 18 of the housing and the tapered plug 24 will prevent removal of the stem and valve element by driving them in the opposite direction (towards the bottom in FIG. 2).

Because there is only a minimal clearance between the second wide portion 36 of the stem and the stem bore, this portion of the stem serves to conceal the recesses. The second wide portion of the stem cooperates with the sleeve to protect the lock pin from attack by instruments inserted into the stem bore.

Because the lock pin is reinforced and protected as described above, the pin can be made smaller than would otherwise be possible. Because the pin can be of relatively small diameter, recesses 40 and 42 can also be of relatively small diameter and therefore do not unduly weaken the stem.

Preferably, the lock pin and the stem are so constructed that the wrenching lug 44 will fail under a torsional loading less than the torsional loading required to bend or break the lock pin and less than the torsional loading required to break the stem at the recesses or at any location between the recesses and the wrenching lug. Therefore, any attempt to defeat the locking mechanism by grasping the wrenching lug and forcibly twisting it will simply shear off the wrenching lug without rotating the tapered plug.

The valve described above can be made from any suitable materials, selected according to criteria of strength, cost and compatibility with the fluids to be conveyed through the valve. For a valve to be used in a natural gas piping system, the housing can be formed from cast iron, the stem can be made of brass, and the elements of the locking mechanism can be formed from steel. To prevent escape of fluids from the valve, appropriate seals, such as elastomeric O-rings may be interposed between the tapered plug 24 and the tapered seat 18 on opposite sides of the passageway 12.

Preferably, in the manufacture of the valve, lock pin 64, sleeve 60, spring 72 and cap 68 are assembled to form a unitary lock assembly and this unit is then inserted into the valve housing. Preferably, the sleeve and cap of the lock assembly are dimensioned so as to provide tight press fits with respective portions of the lock bore 22 of the housing. Thus, during manufacture, the lock assembly can be inserted into the valve housing by simply driving it into the lock bore.

Figure 7:
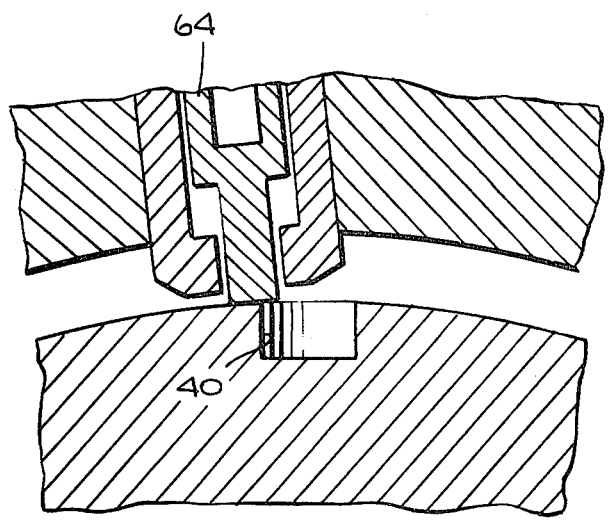
FIG. 7 is a view similar to FIG. 4 but illustrating the lock pin overlapping the edge of a recess in the stem.

It is possible, with the apparatus described thus far, that an individual having once tampered with the valve and realizing that his effort had been defeated by his having caused the valve to lock when he had turned the stem 90°, or possibly having heard the latching mechanism shift the lock pin 64 into locking position, might make a second attempt after the valve had been reopened by an authorized service person. This time however, the unauthorized individual might turn the valve toward the off position by rotating the stem to an annular position relative to the housing just before the point at which the lock pin enters one of the recesses 40, 42 leaving the lock pin near or partially over the recess (FIG. 7). In this way, the fluid flow through the valve could be blocked so that, for example, a gas meter could be by-passed, after which the valve could be reopened, all without having caused the valve to be locked in the closed position.

I have therefore conceived a further embodiment of this present invention by which I am able to prevent such unauthorized manipulation of the valve.

In the embodiment described previously, the recesses 40 and 42 are illustrated as being of cylindrical configuration so that the lock pin 64 rides over the edge of the recess when the stem is rotated towards locking position, and then when the pin clears the edge of the recess, it shifts into fully extended locking position, as shown in FIG. 4.

According to the present embodiment, I form the recesses with a tapered or conical entry ramp that merges with the cylindrical portion in the direction towards the base of the recess. As an alternative construction, I stage the recesses by boring the same to its full depth then counterboring to a depth a fraction, say one half of the full depth of the recess.

By reason of either of these constructions, it will be seen that, upon turning the stem towards locking position, the lock pin will project into a pre-latched position prior to reaching the fully latched position. Since the lock pin travel will be very short when moving into the pre-latched position, it will emit a minimum sound, yet the valve, once having reached this position, will not be able to be reopened except by authorized personnel, but can only be moved to the fully locked position. Thus, should a tamperer attempt to shut the valve by rotating the stem to a position just short of the full off position without locking the stem, such effort will effectively be defeated.

Figure 8:
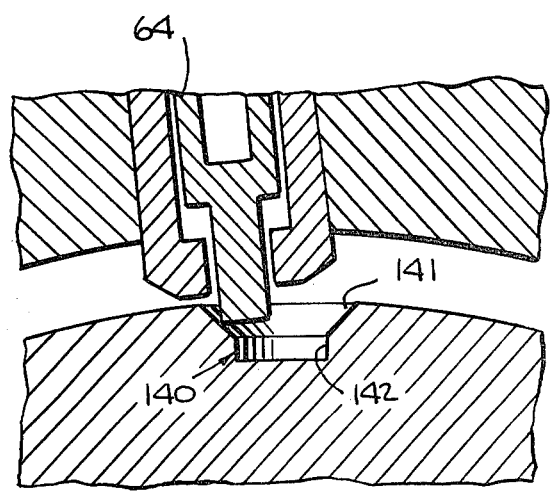
FIGS. 8 and 9 illustrate further embodiments of the present invention.

Turning now to FIG. 8, there is shown a view similar to FIG. 4 but illustrating the recess or bore 140 as being formed to the same depth as recess 40 in FIG. 4, but having a conical entry ramp or counterbore 141 merging with a cylindrical portion 142 in the direction towards the base of the recess. I prefer to form the ramp 141 so that its surface is disposed at an angle of the order of about 45° to the longitudinal axis of the lock pin 64. In this view, the inner end of the lock pin 64 is shown in pre-latch position.

It will be seen that when the parts are in the position shown in FIG. 8, the pin 64 has extended partially along the surface of the conical entry ramp 141. Travel along the ramp surface causes no audible sound. Further, when the pin in engaged at any point on the conical ramp, the valve cannot be turned on again because the sharp edge of the pin will dig into the conical ramp surface and prevent retraction of the pin to the on position. Thus, the only movement possible is to the full off position.

Figure 9:
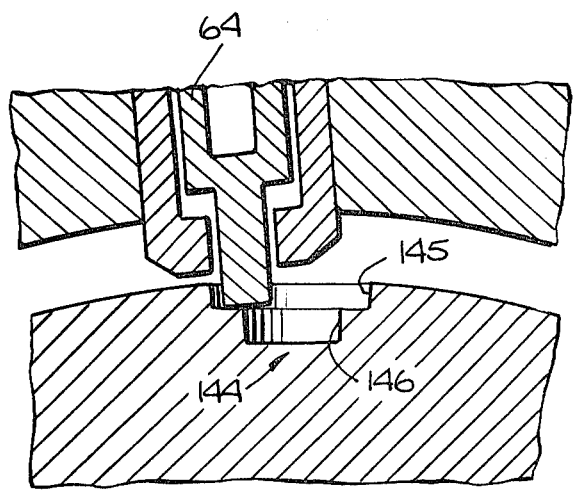

FIG. 9 is similar to FIG. 8 but here, the bore 144 is bored as at 146 to its full depth and is counterbored at 145 to a depth about one half the depth of the bore 146, the lock pin being shown on the step formed between the bore and the counterbore.

The construction shown in FIG. 9 produces a minimum of sound when the pin extends into the counterbore 145 because its extension is relatively short. When the pin is engaged in the counterbore, the valve cannot be turned to the on position and the only movement possible is to the full off position.

Numerous variations and combinations of the features described above can be utilized without departing from the present invention. For example, although the valve described above is arranged to lock in its closed positions, a similar valve can be made to lock in its open positions either by relocating the recesses 40 and 42 of the stem to positions 90° from those illustrated in FIG. 3 or by relocating the bore 28 of the valve element to a position 90° from that illustrated in FIG. 3. Such a "lock open" valve might be utilized, for example, in a piping system between a pressure vessel and a safety valve. Alternatively, four recesses could be provided, to lock the valve in either of two open positions or in either of two closed positions. Similarly, multiple recesses could be provided, for example, to direct the flow of fluid from different sources to different consumers. Therefore, the foregoing description of the preferred embodiments should be understood to be by way of illustration rather than by way of limitation of the present invention as defined in the claims.

What is claimed is:

1. A locking valve comprising:
(a) a housing defining a passageway, a stem bore and a lock bore intersecting said stem bore;
(b) a valve stem seated in said stem bore for movement through a first range of positions encompassing a normal closed position in which said valve stem occludes said passageway and a normal open position in which said valve stem permits fluid flow through said passageway;
(c) said stem being formed with a narrow portion confronting said lock bore, at least one wide portion and a shoulder at the juncture of said wide and narrow portions facing toward the open end of said stem bore and with at least two recesses in said narrow portion;
(d) lock means disposed in said lock bore for automatically arresting movement of said stem upon its movement to one of said normal positions, said lock means including a pin slidably mounted relative to said lock bore and means for biasing said pin toward said stem so that a portion of said pin will enter one of said recesses upon movement of said stem to a position in which said recess is aligned with said lock bore, said lock means further including axial stop means comprising a sleeve mounted in said lock bore, and projecting into said stem bore in the region of said narrow portion thereof said lock pin being slidably mounted in said sleeve, said axial stop means abutting said shoulder upon attempted removal of said stem through the open end of said stem bore whereby at least some of the force necessary to prevent said removal is borne by said axial stop means;
(e) means for limiting movement of said stem to said first range; and
(f) means for selectively moving said stem.

2. A valve as claimed in claim 1, wherein said stem is movable through a second range of positions including an abnormal closed position, said stem occluding said passageway when said stem is in said abnormal closed position, and said lock means being operable to arrest movement of said stem when the same is in the abnormal closed position.

3. A valve as claimed in claim 1 in which said projecting end of said sleeve closely confronts the circumferential surface of the narrow portion of the stem, the lock pin being slidably supported by the sleeve at said projecting end.

4. A locking valve comprising:
(a) a housing defining a passageway, a stem bore open to the outside of the housing at one end and a lock bore intersecting said stem bore;
(b) an elongated stem having a narrow portion, a wide portion and a circumferential shoulder at the juncture of said wide and narrow portions, said stem having at least one bore in its narrow portion, said bore being counterbored and being capable of being aligned with said lock bore, said stem being rotatably disposed in said stem bore so that said narrow portion confronts said lock bore and said shoulder faces towards the open end of the stem bore;
(c) a valve element mounted to said housing for movement between a first closed position in which the valve element occludes said passageway and an open position in which the valve element does not occlude said passageway, said valve element being connected to said stem for movement in conjunction with rotation of said stem;
(d) a lock pin slidably mounted in said lock bore; and
(e) means for biasing said lock pin towards said narrow portion of said stem so that said lock pin will bear on the surface of said narrow portion and will enter the counterbore of said bore when said bore approaches alignment with said lock bore and will enter said bore when said bore is aligned with said lock bore.

5. A valve as claimed in claim 4 further including axial stop means comprised of a hollow sleeve mounted in said lock bore, the projecting end of said sleeve closely confronting the circumferential surface of the stem, the lock pin being slidably mounted in said sleeve and being supported by the sleeve at or near its projecting end.

6. A valve as claimed in claim 5 in which said sleeve is fixedly mounted in said lock bore.

7. A valve as claimed in claim 4 in which said stem has at least two such bores, both of said bores being capable of being aligned with said lock bore.

8. A valve as claimed in claim 7 in which said valve element is movable to a second closed position, one of said bores in said stem being aligned with said lock bore when said valve element is in said first closed position, the other one of such bores being aligned with said lock bore when said valve element is in said second closed position.

9. A valve as claimed in claim 5 in which said stem has a second wide portion, said narrow portion being disposed between said first and said second wide portions, said stem having a second circumferential shoulder at the juncture of said narrow portion and said second wide portion and said sleeve projecting between said shoulders.

10. A valve as claimed in claim 4, wherein said counterbore is tapered inwardly.

11. A valve as claimed in claim 10, wherein said bore is cylindrical and said counterbore is tapered to merge with said cylindrical bore.

12. A valve as claimed in claim 4, wherein said bore and said counterbore are cylindrical.

* * * * *